No. 879,826. PATENTED FEB. 18, 1908.
E. A. MATHERS.
DUMP CART.
APPLICATION FILED NOV. 23, 1905.
2 SHEETS—SHEET 1.
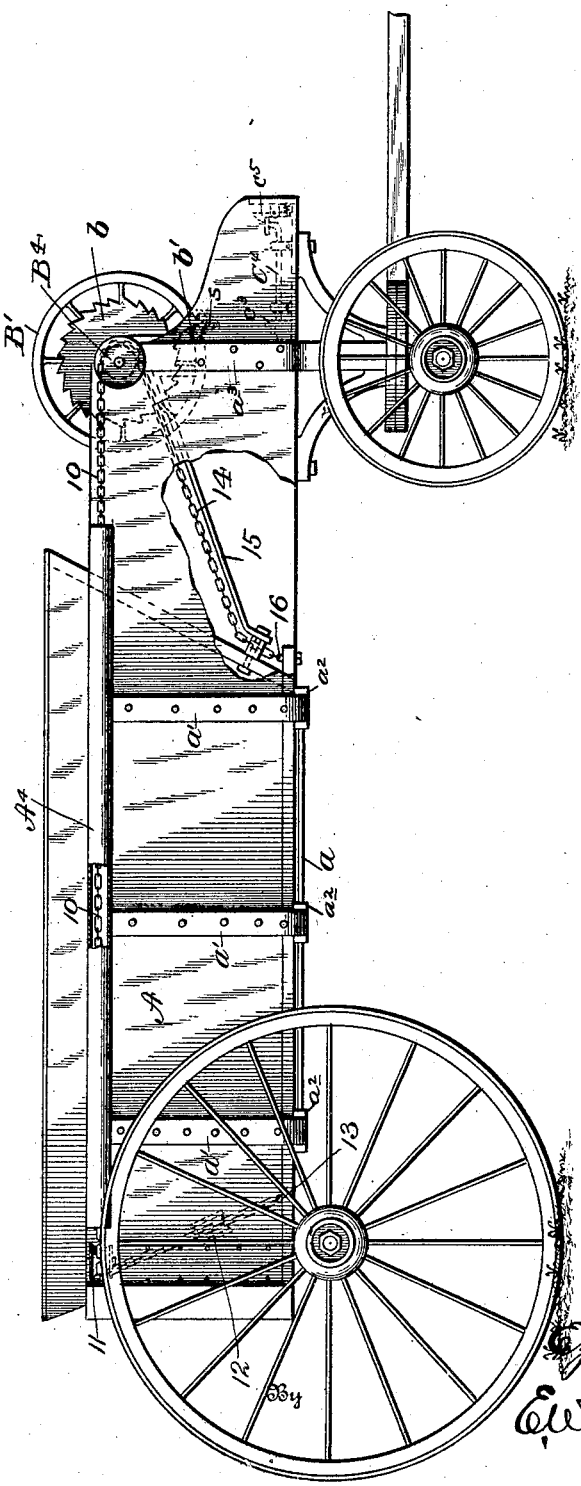

No. 879,826. PATENTED FEB. 18, 1908.
E. A. MATHERS.
DUMP CART.
APPLICATION FILED NOV. 23, 1905.
2 SHEETS—SHEET 2.
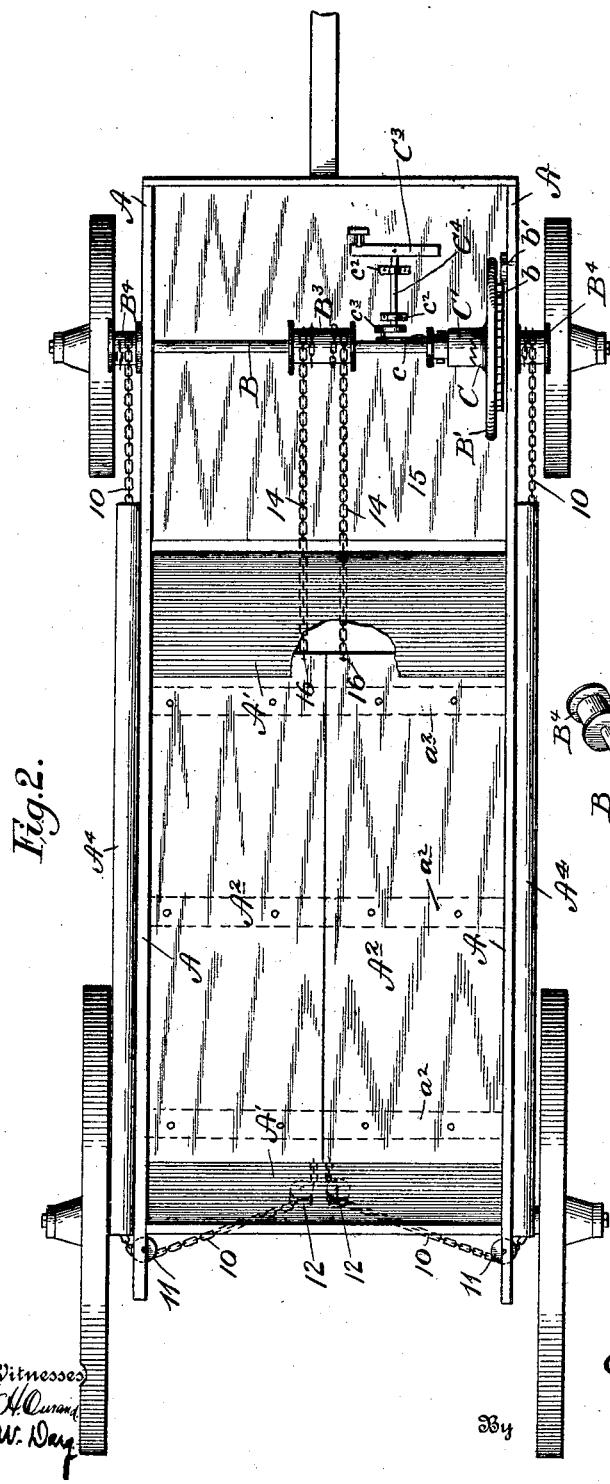
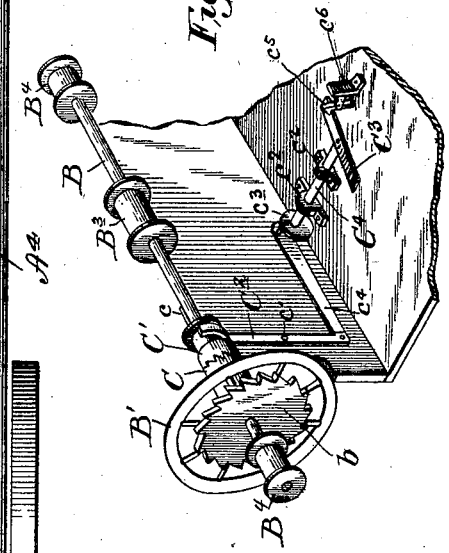
Witnesses
Inventor
Ezra A. Mathers
By
Attorney

UNITED STATES PATENT OFFICE.

EZRA A. MATHERS, OF PHILADELPHIA, PENNSYLVANIA, ASSIGNOR TO ELIHUE ELDRIDGE SMITH, OF PHILADELPHIA, PENNSYLVANIA.

DUMP-CART.

No. 879,826.     Specification of Letters Patent.     Patented Feb. 18, 1908.

Application filed November 23, 1905. Serial No. 288,762.

*To all whom it may concern:*

Be it known that I, EZRA A. MATHERS, a citizen of the United States, residing at Philadelphia, in the county of Philadelphia and State of Pennsylvania, have invented certain new and useful Improvements in Dump-Carts, of which the following is a specification.

My said invention consists in various improvements in the details of construction of dump carts or cars, whereby such a cart is provided which may be easily and conveniently operated and the construction be comparatively inexpensive and at the same time strong and durable, all as will be hereinafter more fully described and claimed.

Referring to the accompanying drawings which are made a part hereof and on which similar reference characters indicate similar parts, Figure 1 is a side elevation of a dump cart of my improved construction with portions of the side broken away to show the operating mechanism more clearly, Fig. 2 a top or plan view of said cart, and Fig. 3 a detail perspective view of the operating mechanism.

In said drawings the portions marked A represent the sides of the cart and B the operating shaft.

The cart body proper is of a usual or any approved construction consisting of the sides A and the inclined ends A', made rigid and fixed together. The bottom is composed of two sections $A^2$ each of which is hinged at its outer edge on a hinge-rod $a$ extending through eyes in the hinge-parts $a'$ on the sides of the body and the hinge-parts $a^2$ on said bottom sections.

The operating shaft B is mounted in suitable bearings on the forward ends of the sides A, or on any suitable frame on the front of the structure. Vertical posts or straps $a^3$ may be secured to these side pieces at the point where said shaft is mounted to afford sufficient strength and rigidity for its support. Said shaft B is provided with a hand-wheel B' near one end with a ratchet-wheel $b$ mounted on its side, with which a pawl $b'$ pivoted to the side A of the wagon body is adapted to engage, a spring $s$ being mounted on the under side of said pawl to normally hold it into engagement with said ratchet-wheel. Said wheel B' is mounted to rotate freely on said shaft B and is provided on its hub with a clutch part C which engages with a clutch part C' mounted on said shaft B by means of a spline $c$. A shifting fork $C^2$ is pivoted on a pivot $c'$ beneath said shaft B and engages with a circumferential groove in said clutch part C' for sliding it back and forth on said shaft B to engage it with or disengage it from the clutch part C on said wheel B'. Said shifting lever $C^2$ is operated by means of a foot lever $C^3$ on the outer end of a rock shaft $C^4$, which is mounted in suitable bearings $c^2$ on the floor at the front end of the structure. On the inner end of said shaft is mounted a crank wheel $c^3$, the crank-pin of which is connected by a link $c^4$ with the lower end of said forked lever $C^2$. A pivoted spring catch $c^5$ is mounted on a standard $c^6$ adjacent to one end of said foot lever $C^3$ and is adapted to engage therewith to lock the lever in position to hold the clutch parts C and C' in engagement. Said shaft B has a central spool $B^3$ and a spool $B^4$ on each end, each of which spools is mounted to turn with said shaft.

From each of the end spools $B^4$ runs a chain 10 back along the upper edge of the sides of the cart through tubes or casings $A^4$, which are secured to said sides in line with the top of said spools, and run nearly to the rear end of the cart where said chains pass over pulleys 11 mounted upon vertical pivots at the top or in line with the tubes and then pass downwardly and toward the center of the bottom of the cart over pulleys 12 mounted near the lower edge and the center on the outside of the rear end A' of the body, as indicated by dotted lines in Figs. 1 and 2. The extreme ends of said chains are connected to eye-bolts 13 in the projecting ends of the hinged sections $A^2$ near their adjacent edges. Similar chains 14 are attached to the center spool $B^3$ near each end thereof and extend rearwardly down over a supporting track 15 and are attached to eye-bolts 16 secured in the projecting inner corners of said hinged sections $A^2$. Said chains 10 are incased within the tubes or casing $A^4$ for the length of that portion of the cart over which the dirt or other material is thrown in loading and are thus protected from interference in operation.

The operation of my said invention is as follows:—The parts being in the position shown in the Figs. 1 and 2, the cart is loaded with any material which it is desired to haul therein. When it is desired to unload said material the operator kicks the catch $c^5$ from engagement with the end of the foot lever $C^3$ and then with his foot tilts down the other end of said lever, which operates, through the rock-shaft $C^4$ and connections running to the forked lever $C^2$, to disengage the clutch part $C'$ from clutch part $C$ and thus release the shaft B, which has been locked in position by means of the spring pawl $b'$, and permits said shaft to rotate freely, allowing the chains to pay out from the spools and the hinged sections $A^2$ comprising the bottom of the cart to fall down under the weight of the load thereon, which load is thus quickly and freely deposited beneath the cart. The operator then reëngages the clutch parts C and C' by pressing down the appropriate end of the foot lever $C^3$ to the position so that the catch $c^5$ will engage therewith and lock it in this position and said clutch parts in engagement. By turning the hand-wheel B', the chains 10 and 14 are then wound upon their respective spools and operate to pull the hinged sections $A^2$ into the position shown in Fig. 2 and again close the bottom of the cart, being held in such position by means of the pawl $b'$ which is in constant engagement with the ratchet wheel $b$ on the side of hand-wheel B'. Said parts are thus held in closed position until disengaged as before described.

Having thus fully described my said invention what I claim as new and desire to secure by Letters Patent, is:—

1. In a dump cart, the combination of the body having a bottom composed of sections mounted on horizontal hinges, tubular casings mounted along the top edges of sides of said body, an operating shaft mounted in suitable bearings on the front of the structure having spools mounted thereon, flexible connections running from said spools to each end of the hinged bottom sections and connected thereto, those running to the rear end passing along the top edges of the sides of the body and through said tubular casings and over pulleys on the rear end of the body in line with said casings, and means for winding, holding and releasing said shaft, substantially as set forth.

2. In a dump cart, the combination of the main body, the hinged bottom sections, the operating shaft carrying spools, a hand-operating wheel connected to said shaft by a clutch connection, a ratchet-wheel mounted thereon, a pawl for holding said ratchet wheel against backward movement, means for opening and closing said clutch and means for locking the clutch parts in engagement, substantially as set forth.

3. In a dump cart, the combination of the body provided with a bottom composed of hinged sections, an operating shaft carrying spools, flexible connections running from said spools over suitably arranged pulleys and connected with the inner edges of said hinged sections at each end, a hand-wheel mounted on said shaft and adapted to be connected therewith through a sliding clutch mounted on said shaft by means of a spline, a ratchet-wheel on the side of said hand-wheel, a pawl on a fixed part alongside said ratchet-wheel for holding it against backward movement, a shifting fork for holding said clutch and mechanism for operating said shifting fork including a locking device for holding the clutch parts into engagement when desired, substantially as set forth.

In witness whereof, I, have hereunto set my hand and seal at Washington, D. C. this 13th day of November, A. D. nineteen hundred and five.

EZRA A. MATHERS. [L. S.]

Witnesses:
E. W. BRADFORD,
CHAS. E. RIORDON.